Patented Oct. 31, 1950

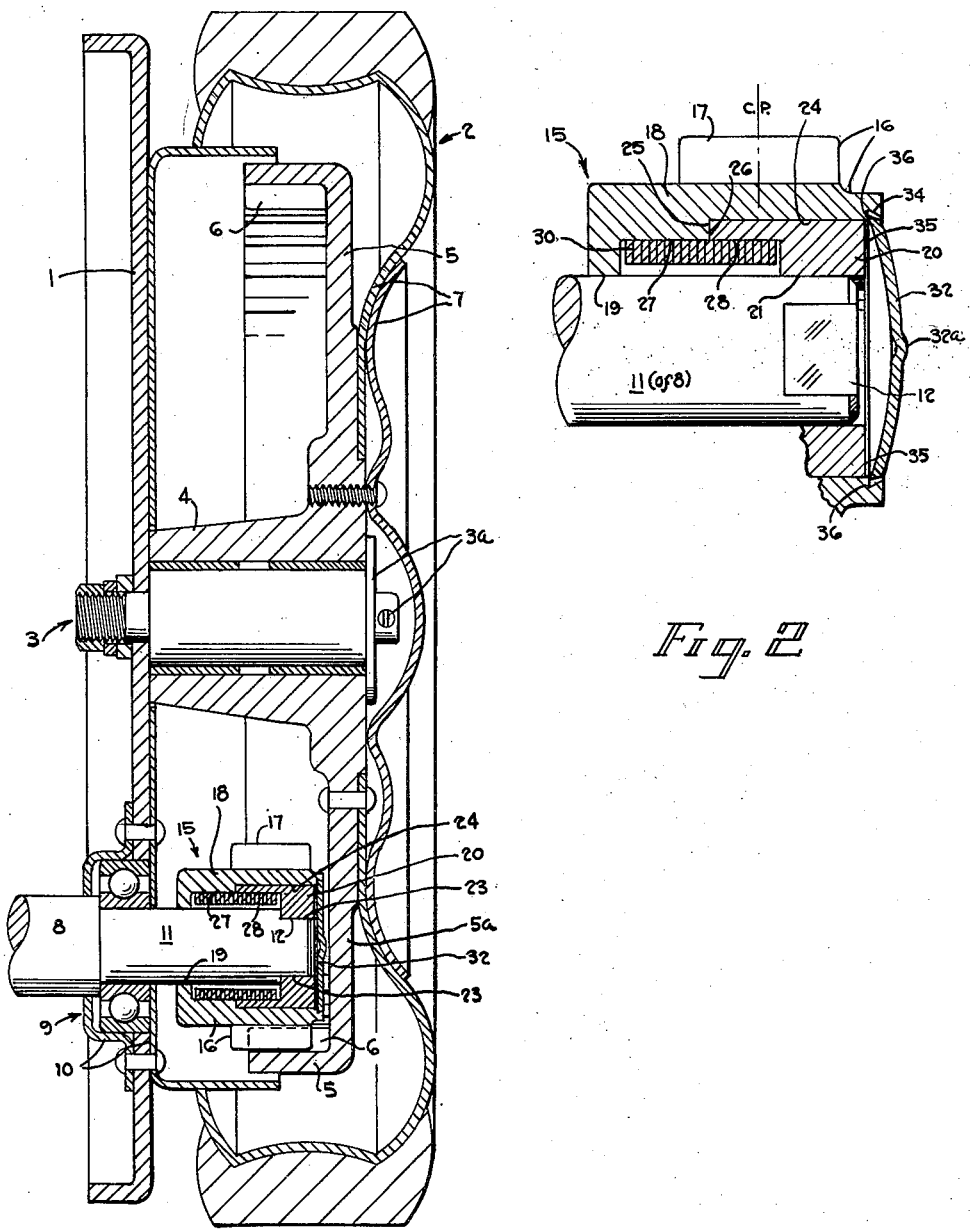

2,528,148

UNITED STATES PATENT OFFICE 2,528,148

OVERRUNNING CLUTCH AND PINION UNIT

Howard Donald Johnston, Indianapolis, Ind., assignor, by mesne assignments, to The Marquette Metal Products Company, Cleveland, Ohio, a corporation of Ohio Application June 23, 1949, Serial No. 100,930

4 Claims. (Cl. 74—413)

The invention relates to an improved overrunning spring clutch and gear or pinion assembly and an improved silent ratchet coupling for lawnmower cutter drives and analogous uses, thus indicating the principal general objects.

The prior patent to W. C. Starkey 2,300,712, November 3, 1942, discusses various reasons why spring clutch drives for the cutter reels of lawnmowers are of unique advantage as compared to the use of conventional ratchet and other overrunning couplings more commonly used for the purpose.

One consideration believed to have delayed general adoption of spring clutches for lawnmower reel drives, notwithstanding manifest adaptability thereto, since they have negligible lag or backlash and are silent, is the problem of excluding dirt and other foreign matter from the essential working parts. Another is: once the clutch spring has been assembled into properly cooperating relationship with its mating parts, that relationship should not be disturbed by inexpert attempts to service or adjust the mechanism. In the illustrative embodiment of subject invention a single simple and inexpensive element (expansion plug) serves to prevent ingress of foreign matter to the clutching members, operates as a locking element in holding the working parts in proper freely operating relationship, and very effectively discourages inexpert persons from tampering with the clutch spring and its coacting drums even though the clutch assembly unit can easily be removed from and replaced on the associated machine. The above indicates further objects.

In the drawing, Fig. 1 is a sectional plan view of one of two operatively identical lawnmower wheel and reel drive assemblies, being intended to represent a typical wheel mounting and reel shaft support; and Fig. 2 is a relatively enlarged detail view of part of the overrunning reel shaft drive coupling taken at right angles to the corresponding portion of Fig. 1, the parts being in working relationship but not yet locked therein.

A main end frame member 1 of the lawnmower machine supports an associated drive wheel assembly 2 on a rigid stub or dead axle assembly 3 fixed to the member 1. The hub 4 of the wheel assembly is part of an internal or ring gear member 5 (teeth at 6) secured to the disclike body and cap assembly 7 of the drive wheel. The wheel is removably secured to the supporting axle 3 by a washer and fastener assembly 3a.

The cutter or reel shaft 8 is journalled in appropriately free bearing assemblies, one shown at 9, supported by a bearing housing assembly 10 fixed to the frame part 1 as clearly indicated.

The illustrated reduced cylindrical end portion 11 of the reel shaft 8 projects beyond the bearing 9 nearly to the disc portion 5a of the ring gear which, as shown, has a smooth inner face in alignment with the reel shaft. The free end portion 11 of the reel shaft is made non-circular at its extremity as by diametrally opposed flats 12 (cf. Fig. 2) as a suitable means to key the drive pinion and clutch assembly 15 to the shaft.

The reel-drive pinion proper, part or member 16, is generally cup shaped, with teeth 17 formed integrally on its hub or sleeve portion 18 for constant mesh with the ring gear teeth 6. Part 16 is the driving element of the spring clutch unit as will later be made clear. Since the pinion assembly in lawnmower reel shaft drives has a cantilever support it is important that both the inner and outer ends of the hub or sleeve portion 18 be firmly radially supported—both inwardly and outwardly of the center of pressure of the meshing gear and pinion teeth—on the projecting end of the reel shaft, while being free to turn for "ratchet" or overrunning action of the clutch mechanism.

An inner (reel end) journal for the pinion part 16, at one side of the center of gear tooth pressure, is formed by a short bore 19 of the gear hub, freely rotatably bearing on the smooth shaft portion 11. Any desired auxiliary seal or dirt-excluder may be provided in or adjacent the journal support 19. None is necessary for lawnmower and analogous service. A corresponding outer (drive wheel end) journal or support for the pinion member 16 is formed in part by a driven element of the clutch assembly, tubular part or member 20. Part 20 has circular inside surface portions 21, Fig. 2, snugly but removably fitting the mating circular portion of the reduced section 11 of the reel drive shaft. Additionally, suitable keying surfaces 23 are provided inside the part 20 slidable on and off the shaft end. The driven element of the clutch (part 20) turns freely in a counterbore 24 of the pinion hub 18. Connection 12, 23 is representative only, of a suitable driving key or spline connection.

The bottom smooth shoulder surface 25 of the counterbore 24 limits the axial movement of the driven clutch sleeve 20 in one direction by being in position to abut its left hand smooth end 26. Cooperating spring clutch drum pockets are formed by oppositely facing or mutually complementary counterbores 27 and 28 in the parts 16 and 20 respectively. These counterbores are approximately cylindrical and of equal diameter. The clutch spring 30 is a simple cylindrically coiled metal helix, preferably with square finished ends, and its total length is somewhat shorter than the double clutch pocket provided by the two counterbores 27 and 28.

The spring 30 is self-energizing to grip the counterbore drum surfaces for unidirectional high torque transmission in a well known manner, having at least some of its (e. g. end) coils in interference fitting (radially strained and contracted) relation to each of the respective pocket surfaces.

The radially inner surface portions of the clutch spring 30 are spaced from the shaft portion 11 to provide a lubricant storage space (may be packed with appropriate grease during assembly). An alternative or supplemental device for insuring lubrication for long periods is to form the members 16 and 20, or one of them, from lubricant-receptive material, for instance by press forming the part or parts from powdered metal (e. g. so-called "sintered metal").

To maintain the pinion and clutch assembly with its working parts free to turn as required of an overrunning coupling, and for other purposes earlier mentioned, the locking expansion plug 32 is provided. This is regarded as self-locking in position in that once it has been deformed beyond its elastic limit into radially expanded condition it has no tendency to return to original form. The pinion hub 18, in addition to its clutch drum and journal-forming counterbores 27 and 24, has an undercut counterbore 34 adjacent to and larger than the counterbore 24. The clutch drum and journal-forming sleeve 20 is of such length that when the adjacent shoulders 25 and 26 are brought into abutment the outer end surface 35, which may be relieved inwardly toward the shaft center, lies slightly inwardly of the undercut counterbore shoulder surface 36 (Fig. 2 only). Thereby when the expansion plug 32 is deformed from its conventional shallow dome shape (Fig. 2) into approximately flat form (Fig. 1) the marginal inner surface of the expansion plug axially overlying the surface 35 of the clutch sleeve 20 will not be likely frictionally to resist free turning of the sleeve within the journal-establishing counterbore 24 during overrunning or ratchet action of the clutch. The plug 32 very effectively seals the entire open end of the hub 18, and may be slightly dome shaped in seated position or provided with a central projection 32a for minimizing friction against the gear disc 5a.

A snap ring (as a partial equivalent of the self-locking expansion plug 32) may be used in a complementary groove corresponding in position to the undercut counterbore 34; but such would not exclude foreign matter from likelihood of obstructing the necessary free relative turning of the mating surfaces of the hub 18 and sleeve 20, nor would it be very effective to discourage disassembly of the unit and tampering with the clutch spring and the rest.

The clutch unit 15 operates substantially as does any overrunning or automatic unidirectional drive spring clutch, as is well known at the present time. Any known or suitable refinements of construction to improve the clutching efficiency or to reduce cost may, of course, be used. As a lawnmower reel shaft drive (two clutches being used) the action of the clutch is silent during idle back-up and in turning corners; there is no appreciable backlash following overrun; and both wheels are normally continually effective to transmit torque during straight forward motion of the machine.

I claim:

1. A toothed pinion and overrunning clutch assembly for connecting a shaft and gear and wherein the assembly is to be carried on a cantilever-forming portion of the shaft, said assembly comprising a tubular hub member carrying the pinion teeth on its periphery between its ends, a journal-forming circular bore in the hub member for engagement with the shaft and located at one side of the center of pressure of the pinion teeth axially of the hub, a journal-forming circular counterbore in the hub member extending beyond said center of pressure away from said journal bore, a rigid sleeve anchored to turn with the shaft and having a circular surface in free running engagement with the counterbore in a region thereof beyond said center of pressure, an overrunning clutch coupling connecting the sleeve and hub member, and an imperforate expansion plug seated in the hub member across said counterbore, said plug permanently holding the sleeve against axial movement out of the counterbore while being free from the sleeve to enable free relative rotation of the sleeve and hub member.

2. A unidirectional drive coupling assembly for connecting a torque transmitting shaft and a toothed pinion telescoping one end of the shaft, a hub portion of said pinion having a bore receiving the shaft as one journal bearing thereon, said hub portion having a counterbore forming an internal clutch surface adjacent said journal bore and a larger diameter counterbore therebeyond toward the free end of the shaft, a sleeve in bearing-journaled free turning relation to the larger counterbore and having a central non-circular opening for snugly receiving a complementary non-circular end portion of the shaft to key the shaft and sleeve together at a region radially aligned with the journal of the sleeve and larger counterbore, said sleeve having a circular internal clutch surface substantially contiguous to the first mentioned clutch surface, a helical clutch spring bridging said clutch surfaces in permanent clutching relationship therewith, and self-locking means seated in a peripheral internal groove of the pinion beyond the sleeve and holding the sleeve and clutch spring against undesired axial movement while enabling free relative rotation of the pinion and sleeve in one direction.

3. The mechanism according to claim 2 wherein the self-locking means is an imperforate expansion plug deformed from slightly dome shape and thereby seated tightly into sealing relation to the internal groove of the pinion.

4. A lawnmower wheel gear and reel shaft drive coupling of the class described, comprising a tubular pinion member around the shaft and open at the free end of the shaft, said member having external teeth for engagement with the gear, separate journal supports carried rigidly by the shaft and located at opposite sides of the center of pressure of the meshing gear and pinion teeth axially of the shaft, one journal support for the pinion member being a sleeve slidably keyed to and piloted on the free end portion of the shaft, the radially external surface of the sleeve forming the associated journal support, a unidirectional driving clutch mechanism comprising a self-energizing clutch spring bridging the sleeve and tubular member for silent ratchet coupling thereof, said spring being disposed between the supports axially of the shaft, and an imperforate expansion plug seated in and against the pinion member, sealing its open end adjacent and across the free end of the shaft, said plug having an annular marginal portion in retaining relation to the sleeve and free therefrom.

HOWARD DONALD JOHNSTON.

REFERENCES CITED

The following references are of record in the file of this patent:

UNITED STATES PATENTS

| Number | Name | Date |
|---|---|---|
| 2,138,786 | Funk | Nov. 29, 1938 |
| 2,300,712 | Starkey | Nov. 3, 1942 |